June 13, 1967
E. G. McCAIN
3,324,832
ROPING HORSE TRAINING DEVICE
Filed Dec. 14, 1965
2 Sheets-Sheet 1
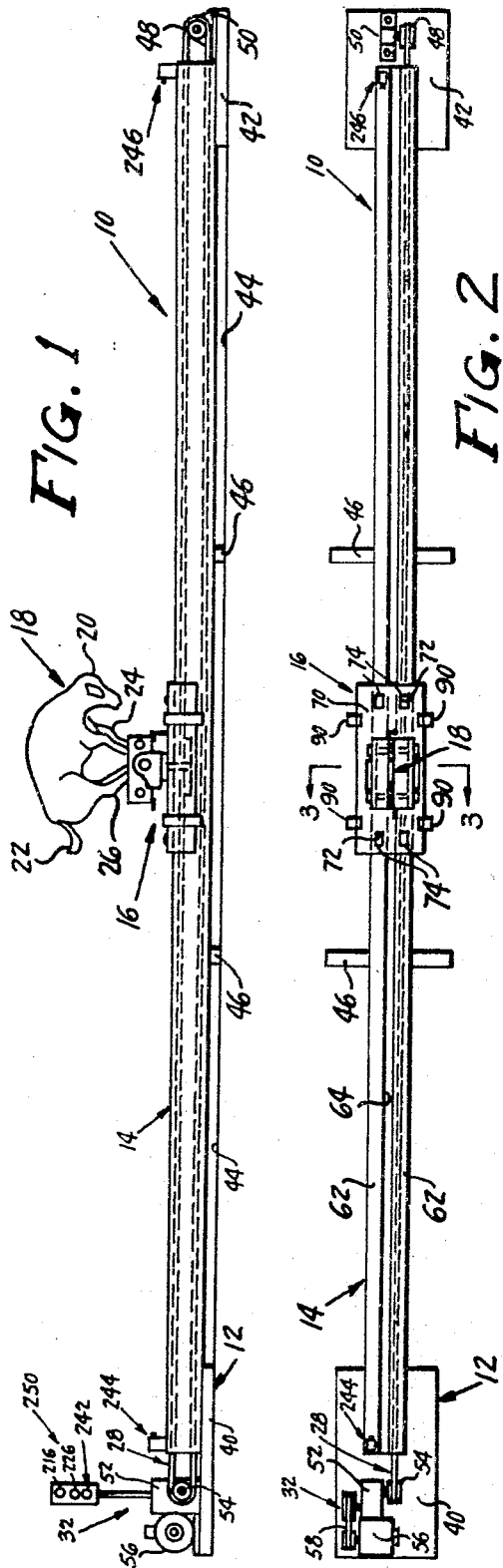
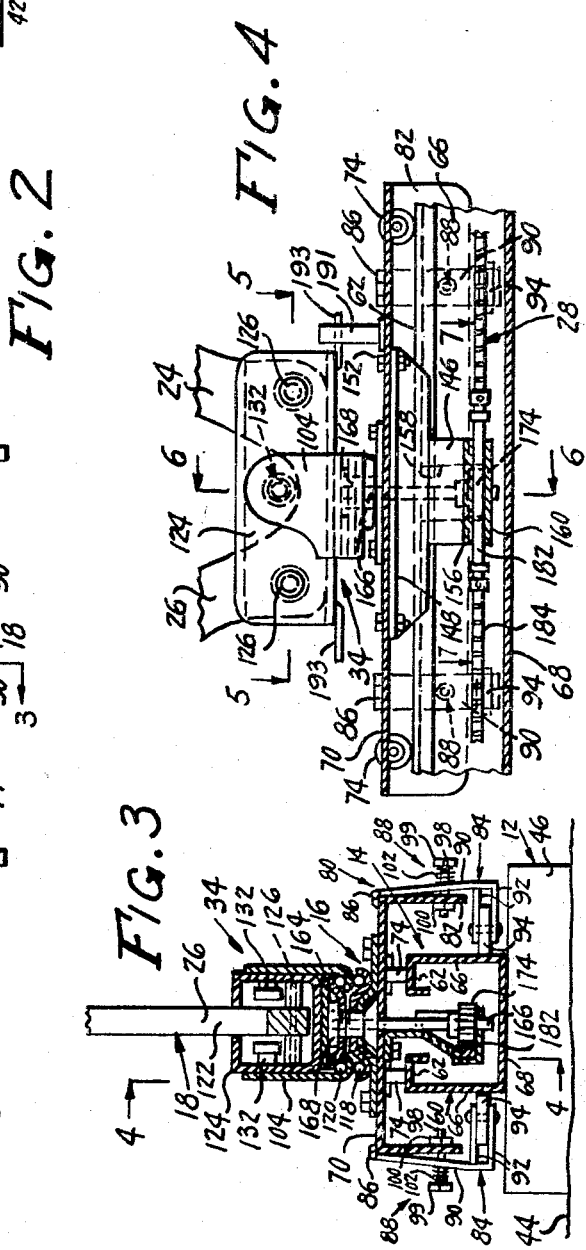
INVENTOR.
EVERETT G. McCAIN
BY Kimmel, Crowell & Weaver
ATTORNEYS.

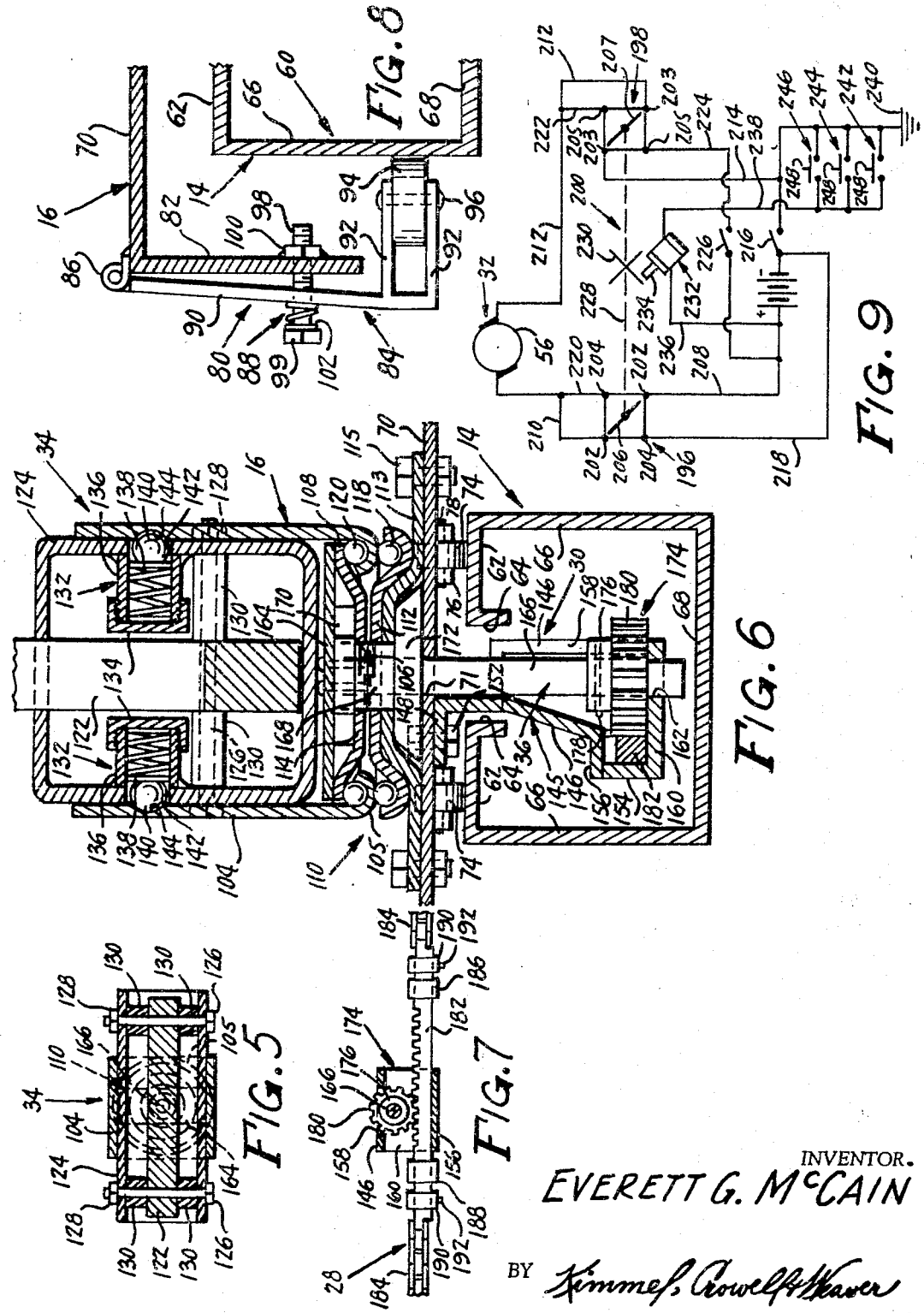

United States Patent Office 3,324,832
Patented June 13, 1967

3,324,832
ROPING HORSE TRAINING DEVICE
Everett G. McCain, Fairbanks, Alaska
(13024 Des Moines Way S., Seattle, Wash. 98168)
Filed Dec. 14, 1965, Ser. No. 513,720
9 Claims. (Cl. 119—29)

This invention relates to a training device, and more particularly to a device mechanically simulating movements of a calf or other animal thereby providing an aid for teaching a horse the art of cutting and roping calves.

Training a horse to become a fine cutting and roping animal is a difficult, arduous and time consuming chore for which few innovations have been perfected in many years. One difficulty in the teaching of a roping horse is the lack of a predictable relatively slow moving subject with which the horse may practice.

A primary object of the instant invention, is therefore, to provide a training device including an artificial animal which mechanically reproduces the normal actions of a calf, with which a trainer may begin the teaching of an inexperienced horse.

Another object of the instant invention is the provision of an artificial animal which moves along a predetermined path and which may be made suddenly to reverse direction and more in the opposite direction providing the trainer an opportunity to familiarize an inexperienced horse with the usual movement of a calf and the technique of roping.

Still another object of the instant invention is the provision of an electrical control system whereby the actions of the calf may be selectively automatically or manually controlled.

Another object of the instant invention is to provide a teaching device for horses which may be inexpensively manufactured and assembled, which is sturdy, durable and which may be used for extended periods with minimal maintenance cost.

A more specific object of the instant invention is the provision of a device of the character including a simulated calf which is reciprocably moved along a predetermined path from a starting position to a selected position and then reversed, either automatically or manually.

Another specific object of the instant invention is the provision of hte device of this character including means for reversing the apparent body position of the calf in accordance with the direction of travel.

Still other objects and advantages of the instant invention reside in the combinations of elements, arrangements of parts, and features of construction, operation and utilization, all as will be more fully pointed out hereinafter and disclosed in the accompanying drawings wherein there is shown a preferred embodiment of this inventive concept.

In the drawings:

FIGURE 1 is a side elevational view of the training device of the instant invention illustrating a simulated calf which may be moved in alternate directions providing a controlled simulated animal movement such that a horseman may have a reliable moving target to assist in teaching a horse the necessary movements in roping and cutting operations;

FIGURE 2 is a top plan view of the teaching device of FIGURE 1;

FIGURE 3 is an enlarged partial transverse cross-sectional view of the device of FIGURE 2 taken substantially along line 3—3 thereof as viewed in the direction of the arrows and illustrating the connection between the simulated calf, a cart movably carrying the calf and a track on which the cart moves;

FIGURE 4 is a vertical partial longitudinal cross-sectional view of the structure of FIGURE 3 taken substantially along line 4—4 thereof as viewed in the direction of the arrows;

FIGURE 5 is a horizontal longitudinal cross-sectional view of the structure of FIGURE 4 taken substantially along line 5—5 thereof as viewed in the direction of the arrows;

FIGURE 6 is an enlarged vertical transverse cross-sectional view of the structure of FIGURE 4 taken substantially along line 6—6 thereof as viewed in the direction of the arrows, and constitutes an enlargement of portions of FIGURE 3;

FIGURE 7 is a horizontal longitudinal cross-sectional view of the structure of FIGURE 4 taken substantially along line 7—7 thereof as viewed in the direction of the arrows, illustrating a connection between the endless belt and a vertical shaft engaged with the movable cart;

FIGURE 8 is an enlarged cross-sectional view of portions of the spring biasing means centering and aligning the movable cart for movement along the track and constitutes an enlargement of a portion of FIGURE 3;

FIGURE 9 is a schematic view of one form of simple electrical control circuit which may be utilized to control an electric motor which controls the direction of travel of the simulated animal.

*General construction*

Referring now to the drawings in detail, wherein like reference characters designate like elements throughout the several views thereof, and more particularly to FIGURES 1, 2 and 6, there is shown generally at 10 a training device in accordance with the instant invention having as its major components a foundation shown generally at 12 supporting a track generally indicated at 14 extended along a selected path movably supporting a cart 16 which releasably carries a simulated animal, illustratively a calf, generally indicated at 18, having a head 20, a tail 22, front legs 24 and rear legs 26.

An endless belt shown generally at 28 is mounted in track 14 and is secured to cart 16 by a connecting means shown generally at 30. A power means shown generally at 32 is connected to endless belt 28 selectively energizing the belt for forward or rearward movement of the cart 16.

One important feature of the instant invention resides in the provision of the mounting means, shown generally at 34, rotatably mounting animal 18 on cart 16 so that its apparent direction of travel is reversed as the direction of travel of belt 28 is reversed, in conjunction with an interconnecting means shown generally at 36 for orienting animal 18, so that head 20 always faces in the direction of movement of endless belt 28.

Base 12 includes a pair of slabs 40, 42 of concrete, wood or the like, supporting each end of track 14 from the ground 44 with a plurality of intermediate transverse members 46 providing supplemental support. An idler sprocket or pulley 48 is journalled at 50 at one end of one slab 42 while the opposite end of the other slab 40 carries a reduction gearbox 52 including a drive sprocket 54, the endless belt 28 moving over sprockets 50, 54 in a conventional manner. A reversible electrical motor 56 is mounted on slab 40 and is interconnected with reduction gear 52 by any suitable drive means such as a conventional belt and pulley arrangement 58. It is understood, however, that driving means 32 may be of any suitable type to reversibly drive endless belt 28 so that the simulated calf 18 may selectively move in either direction.

*Track and cart*

As best seen in FIGURES 3, 6 and 8, track 14 includes a pair of inverted L-shaped legs shown generally at 60 providing a pair of parallel planar horizontal supporting surfaces 62 spaced apart to form a central elongate opening 64 with each of surfaces 62 carrying a depending wall 66 secured to foundation 12 by a horizontal plate 68, track 14 thus being substantially U-shaped in cross-sectional configuration.

As seen in FIGURES 2, 3 and 6, cart 16 includes a horizontal planar structural member 70 having a central aperture 71 and a plurality of cutouts 72, each of the cutouts receiving a rotatable wheel 74 journalled on the underside of structural member 70 by aligned brackets 76 and stub axles 78. Wheels 74 are supported by surface 62 with a pair of centering means shown generally at 80 in FIGURES 3 and 8 operating to insure continuous positioning of wheels 74 on surface 62.

Each centering means 80 includes a pair of oppositely disposed flanges 82 depending from member 70 outwardly of track 14 and a spring biased arm 84 hinged at 86 outwardly of the top of each flange 82. Spring means generally indicated at 88 biases each arm 84 inwardly toward the side wall 66 of track 14. Each arm 84 includes a substantially vertical segment 90 from which extend a pair of spaced apart parallel horizontal segments 92 carrying a movable wheel 94 therebetween by a stub axle 96. Spring means 88 includes a bolt 98 having a head 99 and a nut 100 connecting vertical segment 90 of arm 84 with depending flange 82. A helical spring positioned between head 99 and vertical segment 90 biases the latter and its associated wheel inwardly toward track 14. Cart 16 is thus freely movable longitudinally along track 14 and held in centered relation thereon.

Although track 14 is illustrated as straight, it will be obvious that it may be of any desired configuration. It will also be readily apparent that any fixed structural connection between endless member 28 and planar structural member 70 will result in the propulsion of cart 16 along track 14.

Referring now to FIGURES 4, 5 and 6, a mounting means 34 is disclosed which releasably and rotatably supports calf 18 on cart 16 and includes an open topped, open bottomed body 104, having inwardly turned flanges 105 at the bottom forming a bearing race accommodating ball bearings 120 of a bearing means shown generally at 110. Bearing means 110 also includes a bracket 113, affixed by bolts 115 to planar member 70, providing support for a lower disc 112 having a circular bearing race receiving ball bearing 118 supporting body 104. An upper disc 114 is located above disc 112 and is supported by the upper surfaces of bearings 120 with a shaft 166 residing in apertures 106 formed by discs 112, 114 and by bracket 113, coaxial with aperture 71 as will be explained more fully hereinafter.

As disclosed in FIGURES 4, 5 and 6, the feet of legs 24, 26 join in a plate 122 which is secured to a box-shaped support 124 by a pair of transversely extending bolts 126 and nuts 128 with bushings 130, serving to center plate 122 and consequently animal 18. Support 124 is releasably held in body 104 by a pair of spring biased detent devices shown generally at 132 each of which comprises a stationary tubular guide 136 affixed to support 124 and closed by a threaded cap 134. A compression spring 138 in guide 136 biases a ball detent 140 outwardly of a retaining opening 142 in support 124 into an aligned concaved recess 144 in body 104.

As will be readily apparent, roping of the simulated calf, when the horse being trained stops, will exert sufficient force on plate 122 to release detents 140 and pull support 124 from body 104 of mounting means 34, thereby apparently throwing the calf and teaching the horse to stop and brace after the calf is roped.

*Orienting means*

An additional important feature of the instant invention resides in the provision of means for reversing the apparent position or directional orientation of calf 18 when driving means 32 reverses the direction of movement thereof, which is important as indicating visually to the horse, the direction of movement of the animal thus lending a considerable factor of realism to the teaching process.

As seen in FIGURES 4, 6 and 7, one component of the orienting means of the instant invention is connecting means 30 which includes a box-shaped structure generally indicated at 145 having upstanding walls 146 connected at their upper ends to cart 16 by a horizontal plate 148 and a plurality of frictional fasteners 152. As shown in FIGURE 6, plate 148 is formed such that walls 146 depend through elongate opening 64 into the interior of track 14.

Connecting means 30 also includes an outwardly offset vertical plate 154 connected to one of walls 146 by a horizontal plate 156. The other wall 146 is formed with a cutout 158 of greater vertical extent than plate 154 and section 156. A horizontal planar segment 160 closes the bottom of connecting means 30 and is provided with a reduced diameter bore 162 coaxial with apertures 71, 106.

The orienting means also includes interconnecting means 36 which acts operatively to engage endless belt 28 with mounting means 34 for rotating U-shaped body 104 on bearing means 110 as will be more fully explained hereinafter. Interconnecting means 36 includes a rectangular plate 164 positioned in the bottom of U-shaped body 104 and fixed to a shaft 166 extending through apertures 106, 71, into the interior of connecting means 30 with the lower end of shaft 166 journalled in aperture 162.

Surrounding the upper portion of shaft 166 is a collar 168 received in aperture 106 and formed with an upper shoulder 170 engaging the indentation formed by upper dished plate 114 and a lower shoulder 172 residing between bracket 113 and planar member 70. It will be readily apparent that the rotation of shaft 166 will result in the rotation of rectangular plate 164 and consequently U-shaped body 104 about the axis of shaft 166. Accordingly, in order to reverse the position of calf 18, it is necessary to rotate shaft 166 180 degrees or an odd numbered multiple thereof.

Pinned on the lower end of shaft 166 is a pinion 174 including an apertured collar 176 through which extends a pin 178 affecting a secure but readily releasable connecting with shaft 166. As seen in FIGURES 6 and 7, pinion 174 extends into cutout 158 to provide access for the removal of pin 178. Depending walls 66 are preferably provided with a removable plate portion to permit access to the interior of track 14 for removal of pin 178 for purposes explained hereinafter.

Teeth 180 of pinion 174 engage a rigid toothed rack 182 constituting a portion of endless belt 28 which is illustrated as a chain comprised of a plurality of links 184 but which may be made of any suitable pliant material. Rack 182 is connected between spaced links 184 of endless belt 28 and carries, on each side of pinion 174, a resilient stop member 186, 188, fixed against outward movement by set blocks 190 affixed to rack 182 by a set screw 192. Supplementary stop means is provided and comprises an upstanding post 191 affixed to cart 16 (see FIGURE 4) and an extension 193 secured to support 124 engageable thereby.

When the direction of travel of endless belt 28 is reversed, pinion 174 is rotated by rack 182 until it comes in contact with the opposite stop member 186 or 188, at which time rotation ceases and reciprocation of connecting means 30, and consequently cart 16, will begin. The change in the direction of movement of endless belt 28 thus initially imparts only rotary movement to pinion 174 until calf 18 is rotated 180 degrees, after which pinion 174 having come into contact wtih a stop member 186 or 188, reverse movement of cart 16 is initiated. Since it is preferable to position the head of calf 18 in the direction of travel, the teeth of rack 182 and pinion 174 are so correlated such that calf 18 rotates substantially exactly 180 degrees. If the assembly of device 10 results in calf 18 being slightly out of alignment, pin 178 may be removed from collar 176 through cutout 158 allowing adjustment of shaft 166 and pinion 174 relative to rack 182 providing for the adjustment thereof.

Control circuit

Referring now to FIGURE 9, electrical control circuit 38 is illustrated as connecting electric motor 56 to a battery 194 through a pair of current reversing switches indicated generally at 196, 198, with an indexing means shown generally at 200 for automatically or manually reversing the direction of current flow through motor 56 thereby reversing the direction of rotation thereof and consequently reversing the movement of endless member 28 and animal 18.

Each of current reversing switches 196, 198 includes two pair of diagonally disposed stationary contacts 202, 203, 204 and 205 with a movable pointer 206 selectively electrically connecting contacts 202 or contacts 204. As illustrated in FIGURE 9, a wire 208 leads from the positive side of battery 194 to contact 202 of switch 196 with a wire 210 leading from the other of contacts 202 to one terminal of motor 56. A wire 212 leads from the other terminal of motor 56 to one of contacts 203 of switch 198 with a wire 214 connecting the other contact 203 of switch 198 to the negative side of battery 194. A suitable two position switch 216 is interposed in wire 214 for breaking the electrical circuit leading to motor 56. Closing of switch 216 thus energizes motor 56 in one direction to move calf 18 in a first direction from right to left as seen in FIGURE 1.

A wire 218 connects the negative side of battery 194 to one of contacts 204 of switch 196 and has a branch line 220 connecting the other of contacts 204 with wire 210. Another branch line 222 connects wire 212 with one of contacts 205 of circuit reversing switch 198 with another wire 224 connecting the other of contacts 205 with the positive side of battery 194. A second two position switch 226 is interposed in wire 224 and preferably interconnected with switch 216 so that the opening of either switch opens both switches. Thus rotation of both pointers 206 and 207 of current reversing switches 196, 198 selectively connects the positive and negative sides of battery 194 with motor 56 to reverse the same upon direction of an operator, or automatically.

Indexing means 200 provides a convenient mechanism for selectively directing current in either of two directions through motor 56 and includes a shaft 228 drivably connected with pointers 206 and 207 which are rotatably mounted in switches 196 and 198 respectively, through a ratchet wheel 230 secured to drive shaft 228. Ratchet wheel 230 is arranged for 90 degree rotation and consequently rotates pointers 206 through an arc of 90 degrees thus selectively actuating contacts 202 and 204.

A solenoid generally indicated at 232 includes an extensible normally retracted core 234 positioned adjacent ratchet wheel 230 for conventional rotating thereof. A wire 236 connects the coil of solenoid 232 to one side of battery 194, the other side being connected by a wire 238 to a ground 240 through a plurality of normally open parallel switches shown generally at 242, 244, 246. Each of switches 242, 244, 246 includes a normally open operating button 248 any of which may be depressed to energize the coil of solenoid 232 to rotate ratchet wheel 230 and consequently pointers 206 and 207 of switches 196 and 198. Switches 216, 226 and solenoid switch 242 are preferably positioned at an operator's station 250 in FIGURE 1, with solenoid switch 244 positioned adjacent one end of track 14 and solenoid switch 246 adjacent the other end.

Closing of switches 216, 226 will energize motor 56 driving it in a selected direction depending upon the orientation of pointers 206. Similarly, the actuation of any of switches 242, 244, 246 will energize solenoid 232 to rotate pointers 206 and 207 to reverse the direction of drive of motor 56. Since switches 244, 246 are positioned at opposite ends of track 14, it will be apparent that calf 18 will start from one end thereof, travel to the other end thereof, be reoriented as to position through the action of pinion 174 and rack 182, and return to the starting position. Since a horse may become accustomed to such routine movement of simulated calf 18 and merely wait at one end of track 14 for the animal to return, solenoid switch 242 is provided at operator's station 250 to allow the operator to stop, start and reverse the movement of calf 18 in any random manner desired.

It is now seen that there is herein provided an improved training device for horses which accomplishes all of the objects of the instant invention and others, including many advantages of great practical utility and commercial importance.

Since many embodiments may be made of the instant inventive concept, and since many modifications may be made in the embodiment hereinbefore shown and described, it is to be understood that all matter herein is to be interpreted merely as illustrative and not in a limiting sense.

I claim:
1. A training device for horses comprising:
an artificial animal for simulating the movements of a live animal;
means for moving the animal along a predetermined path in a first direction and for moving the animal along the path in a second direction opposite from the first direction; and
means for orienting the animal to face in the first direction when the animal is moved in the first direction and to face in the second direction when the animal is moved in the second direction and means, on the means for moving the animal, rotatably mounting the animal about a substantially vertical axis; and means interconnecting the mean for moving the animal and the means mounting the animal rotating the animal through an arcuate distance about equal to 180° coincident with a change in the direction of movement of the animal.

2. The training device of claim 1 wherein the means moving the animal comprises:
an endless belt arranged for movement in the predetermined path to propel the animal therealong;
a track juxtaposed to the endless belt and extending through at least a portion of the predetermined path;
a cart movably mounted on the track and carrying the animal; and
means connecting the cart and the endless member for propelling the cart along the track.

3. The training device of claim 2 wherein the orienting means comprises:
means, on the cart, mounting the animal for rotation about a substantially vertical axis; and
means interconnecting the means mounting the animal for rotation and the endless belt to rotate the animal through a predetermined arcuate distance about 180° when the endless member changes its direction of travel.

4. The training device of claim 3 wherein
the endless belt includes a toothed rack;
a toothed pinion meshing with said rack is included in the interconnecting means, the teeth on the pinion and the rack being correlated to rotate the animal the predetermined arcuate distance; and
a shaft included in the interconnecting means fixedly secured to the pinion and the animal for simultaneous rotation.

5. The training device of claim 4 including
stop means carried by the endless belt and the connecting means for precluding disengagement of the pinion and rack and for drivably connecting the endless belt and the cart for reciprocable movement.

6. The training device of claim 2 wherein
the track includes a pair of spaced apart supporting surfaces having a central elongate opening therebetween;

the cart includes roller means mounted on the supporting surfaces for movement therealong;

the supporting surfaces lying between the cart and the endless member; and the means connecting the endless belt and the cart for simultaneous movement extends through said elongate opening.

7. The training device of claim 6 including means centering and aligning the connecting means in the elongate opening through at least a portion of the predetermined path.

8. The training device of claim 7 wherein the centering means includes a flange depending from each of the supporting surfaces, oppositely disposed means on the cart engaged with each of the depending flanges centering the cart and the connecting means in the opening.

9. The training device of claim 1 including means releasably securing the animal in the cart to separate the animal from the cart upon the exertion of an upward pull on the animal.

References Cited

UNITED STATES PATENTS

| | | | |
|---|---|---|---|
| 1,658,054 | 2/1928 | Levy | 46—145 |
| 2,424,354 | 7/1947 | Ford | 46—122 |
| 2,784,252 | 3/1957 | Grierson et al. | 46—202 |
| 2,787,088 | 4/1957 | Gridley | 46—202 X |
| 2,819,900 | 1/1958 | Brackett | 273—105.2 X |
| 2,871,915 | 2/1959 | Hogan | 119—29 X |
| 2,969,768 | 1/1961 | Grant | 119—29 |
| 3,117,395 | 1/1964 | Einfalt | 46—145 |
| 3,241,263 | 3/1966 | Branstner | 46—202 X |

SAMUEL KOREN, *Primary Examiner.*

ALDRICH F. MEDBERY, *Examiner.*